(12) United States Patent
Smith et al.

(10) Patent No.: US 6,944,692 B2
(45) Date of Patent: Sep. 13, 2005

(54) AUTOMATED CALIBRATION OF I/O OVER A MULTI-VARIABLE EYE WINDOW

(75) Inventors: Brian L. Smith, Sunnyvale, CA (US); Jue Wu, Mountain View, CA (US); Jyh-Ming Jong, Saratoga, CA (US); Wai Fong, San Jose, CA (US); Leo Yuan, Los Altos, CA (US); Prabhansu Chakrabarti, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 447 days.

(21) Appl. No.: 09/951,928

(22) Filed: Sep. 13, 2001

(65) Prior Publication Data

US 2003/0051086 A1 Mar. 13, 2003

(51) Int. Cl.⁷ .......................... G06F 13/42; G06F 11/04; G06K 5/04
(52) U.S. Cl. ...................... 710/106; 714/700; 713/503
(58) Field of Search .......................... 710/100, 104, 710/105, 106, 305, 306, 311, 312; 714/700, 712; 713/500, 503

(56) References Cited

U.S. PATENT DOCUMENTS

| | | | | |
|---|---|---|---|---|
| 4,928,278 A | * | 5/1990 | Otsuji et al. | 714/700 |
| 5,712,855 A | * | 1/1998 | Goto et al. | 714/700 |
| 5,935,257 A | | 8/1999 | Nishimura | |
| 5,978,742 A | * | 11/1999 | Pickerd | 702/66 |
| 6,028,451 A | * | 2/2000 | Ruff | 326/82 |
| 6,041,419 A | | 3/2000 | Huang et al. | |
| 6,326,830 B1 | | 12/2001 | Brady et al. | |
| 6,546,343 B1 | | 4/2003 | Batra et al. | |
| 6,560,716 B1 | | 5/2003 | Gasparik et al. | |
| 6,606,575 B2 | * | 8/2003 | Miller | 702/104 |
| 6,622,107 B1 | | 9/2003 | West | |
| 6,684,350 B1 | * | 1/2004 | Theodoras et al. | 714/712 |

OTHER PUBLICATIONS

Application Specific Integrated Circuits, Addison Wesley Longman Inc., section 14.7, 1997.*
European Search Report for 02256425.6–2212–,Feb. 17, 2003, 3 pages.

* cited by examiner

*Primary Examiner*—Khanh Dang
(74) *Attorney, Agent, or Firm*—Meyertons Hood Kivlin Kowert & Goetzel, P.C.; B. Noël Kivlin; Erik A. Heter (57) ABSTRACT

A method and apparatus for automated calibration of I/O over a multi-variable eye window is provided. A transmitter may conduct data transmissions to a receiver of an integrated circuit (IC) over a plurality of signal lines. The data transmissions may be conducted according to a certain parameters or sets of parameters. Parameters may include voltage levels at which signals are transmitted or timing delays. The receiver may determine whether the correct data value was received over each signal line. The results may be recorded in a storage mechanism in the same IC as the receiver. The storage mechanism may, for each signal line, store a pass/fail result corresponding to the particular parameters for the data transmission. The system may select the parameters which subsequent transmissions are to be conducted over each of the plurality of signal lines from the storage mechanism.

24 Claims, 5 Drawing Sheets

| Signal Line A | T1 | T2 | T3 | T4 | T5 | T6 | T7 | T8 | T9 | T10 |
|---|---|---|---|---|---|---|---|---|---|---|
| V1 |  |  |  | p | p | p |  |  |  |  |
| V2 |  |  | p | p | p | p |  |  |  |  |
| V3 |  |  | p | p | p | p | p |  |  |  |
| V4 |  | p | p | p | p | p | p | p |  |  |
| V5 | p | p | p | p | p | p | p | p | p |  |
| V6 | p | p | p | p | p | p | p | p | p | p |
| V7 |  | p | p | p | p | p | p | p | p |  |
| V8 |  | p | p | p | p | p | p |  |  |  |
| V9 |  |  | p | p | p | p | p |  |  |  |
| V10 |  |  | p | p | p | p | p |  |  |  |
| V11 |  |  | p | p | p | p |  |  |  |  |

AUTOMATED CALIBRATION OF I/O OVER A MULTI-VARIABLE EYE WINDOW

BACKGROUND OF THE INVENTION

1. Field of the Invention

This invention relates to electronic systems, and more particularly, the optimization and margin characterization of input/output lines.

2. Description of the Related Art

In the design and operation of high-speed digital systems, such as computer systems, skew occurring on signal lines is one important consideration. Skew may be defined as timing differences between signals due to various propagation delays. In order for data to be received at the correct value, it must be latched into a receiver at a certain time, at a certain voltage level. One timing difference of critical importance in digital systems is the timing difference that may exist between clock signals and data signals. These timing differences may occur for a number of reasons, such as varying signal line lengths, electrical characteristics of individual signal lines, and so on.

Figure 1:
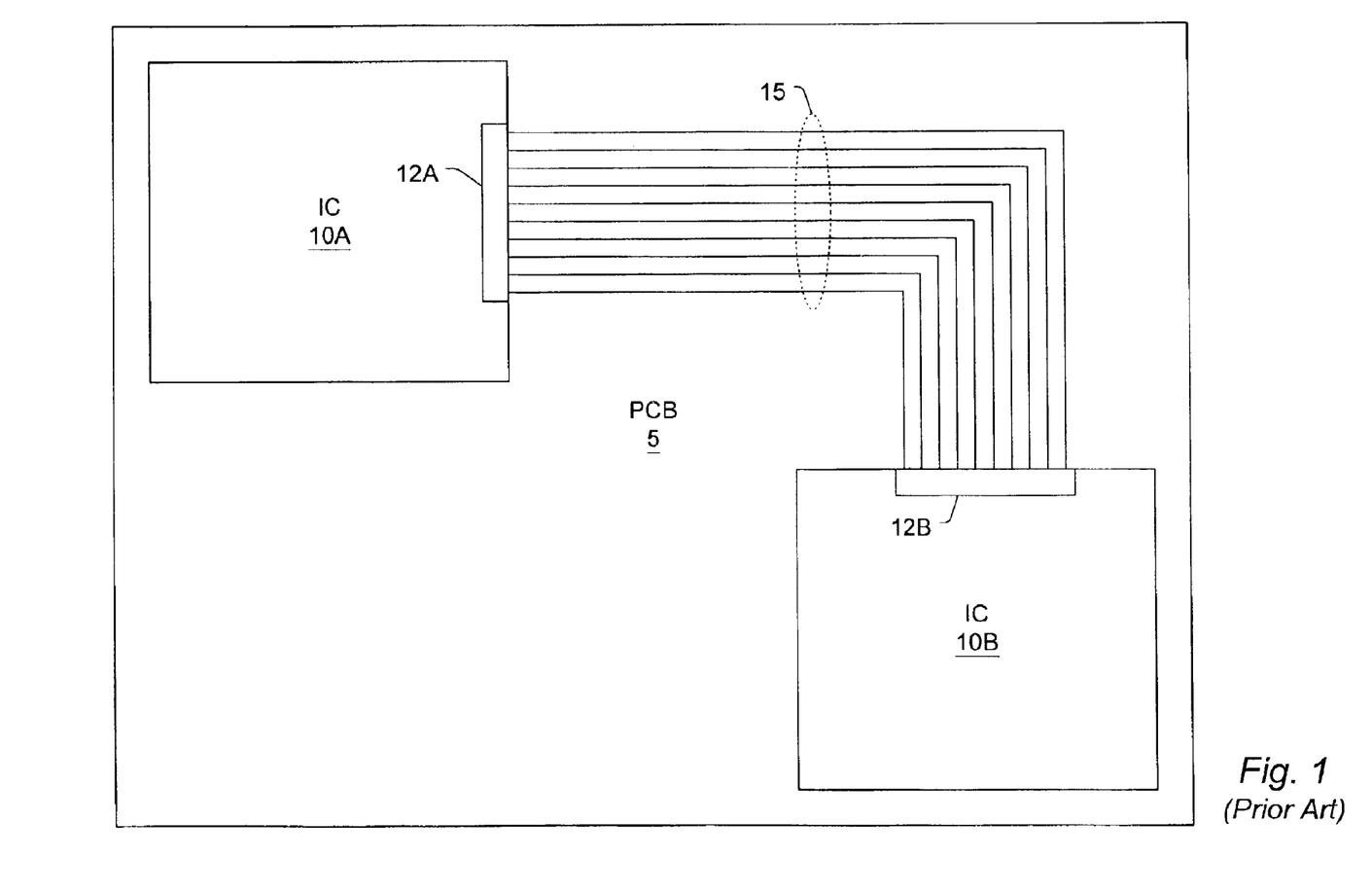
FIG. 1 (Prior Art) is a drawing of an exemplary printed circuit board having two integrated circuits (IC's) coupled by a plurality of signal lines.

FIG. 1 is a drawing of an exemplary printed circuit board (PCB) having two integrated circuits (IC) coupled by a plurality of signal lines. PCB 5 includes IC's 10A and 10B. IC's 10A and 10A include data ports 12A and 12B, respectively. Data ports 12A and 12B are coupled to each other by a plurality of signal lines 15. Due to space limitations, signal lines 15 must be routed in the manner shown in the drawing. Due to this routing, some of signal lines 15 are significantly longer than others. Signals traveling along the longer signal lines may take longer to travel between the two data ports. In some cases, data transfers between the two ports may be required to be performed in parallel. Thus, the receiving data port must latch the data from all lines simultaneously. Thus, since the data must be latched simultaneously, the timing differences between the various signal lines becomes critical.

Figure 2:
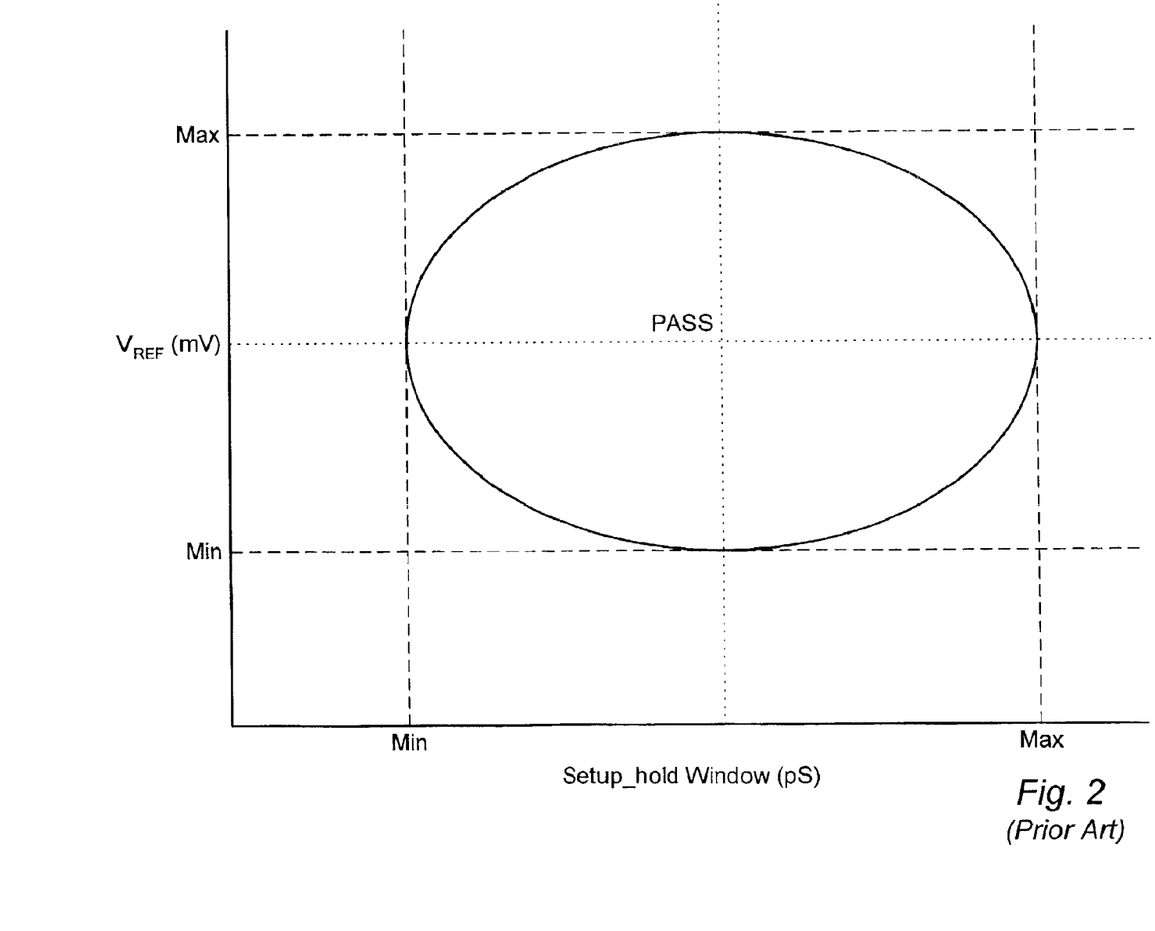
FIG. 2 (Prior Art) is a drawing illustrating an exemplary eye pattern.

Calibrating I/O lines may include tuning voltage levels and timing delays so that a signal is sampled within an enclosed area of an eye pattern. An exemplary eye pattern is shown in FIG. 2. The eye pattern may be plotted as an area on a graph of voltage vs. time (setup time, hold time), with voltage on the vertical axis and time on the horizontal axis. The contiguous enclosed regions within the lines may represent the area in which data may be accurately latched into a receiver. Ideally, signal sampling will occur in the middle of the eye pattern, at a point where both the voltage level and the setup/hold time allow for a large margin of operation for these parameters. Optimizing the reception of such signal transmissions may include tuning the voltage offset levels and tuning delay times as to ensure that the signal arrives at the receiver at a voltage level of sufficient magnitude. Optimizing the reception may also include adjusting a timing delay for sampling the signal in order to ensure that the setup and hold times are sufficient to properly receive the data. This may be performed for clock synchronous or source synchronous systems, but may have a greater impact on source synchronous systems, which typically operate at higher clock frequencies and with smaller margins of operation.

Sampling at points other than the middle of the eye pattern may reduce the margin of operation for either the voltage or setup/hold time. For example, if the voltage at which the signal is sampled is at a level that is above the midpoint, the margin of operation of the delay time may be less. Similarly, if a signal is sampled at a setup/hold time that is at a point other than the midpoint, the margin of operation of the voltage may be less. Furthermore, changing the voltage levels may affect the setup/hold times, and changes to the setup/hold times may affect the voltage levels. Thus, tuning both the voltage levels and delay times may involve the balancing of potentially conflicting requirements.

The calibrating of I/O lines may often times be performed during the design verification phase for an electronic system. This may involve a manual process of setting the voltage and timing delays for signal transmissions that occur in the system. Typically, these parameters, once set, do not change throughout the operating life of the system. Thus, changes in the operating conditions of the system may result in lower margins of operation for the voltage levels and/or the timing delays.

SUMMARY OF THE INVENTION

A method and apparatus for automated calibration of I/O over a multi-variable eye window is provided. In one embodiment, a transmitter may conduct data transmissions to a receiver over a plurality of signal lines. The transmitter and the receiver may be part of a single integrated circuit (with the transmitter and receiver coupled by signal lines which loop back), or may be located on separate integrated circuits. In some embodiments, either the transmitter or the receiver may be part of a test system. The data transmissions may be conducted according to a certain set of parameters or sets of parameters. Parameters may include voltage levels at which signals are transmitted (i.e. a voltage level for a logic one and a second voltage level for a logic zero), voltage threshold levels for which received signals are recognized as a logic one or logic zero, or timing delays. The receiver may receive the data transmissions, latching in the transmitted data according to the parameters. After receiving the data, the receiver may determine whether the correct data value or sequence of patterns was received over each signal line. The results of this determination may be recorded in a storage mechanism, such as a table of entries stored within the IC in which the receiver is located. The table may, for each signal line, store a pass/fail result corresponding to the particular parameters under which the data transmission occurred. The table may comprise a plurality of entries of pass/fail results corresponding to data transmissions over individual signal lines. The system may select the parameters which subsequent data transmissions are to be conducted over each of the plurality of signal lines from the table.

In one embodiment, the system may be configured to select a particular set of parameters for each signal line over which data is to be transmitted. The set of parameters for a given signal line may differ from the parameters selected for other signal lines. As previously noted, the set of parameters may include voltage levels for each data value (e.g. logic zero and logic one) and may also include a delay time. The voltage levels may be set by an adjustable voltage source in the transmitter, which may include separate voltage levels for each signal line in this embodiment. Alternatively, logic voltage offset (or threshold) levels (i.e. those levels for which the receiver recognizes a signal to be a logic 0 or logic 1) may be adjusted by the receiver. The delay time may also be adjusted by the receiver, or in some embodiments, the transmitter. Thus, it may be possible to adjust both the voltage level and the delay time for each individual signal line (at either the receiver or transmitter, depending upon the embodiment) in order to get the sampling point at or near the middle of the eye pattern.

In another embodiment, some parameters may be adjusted for a group of lines. For example, a transmitter may include only one adjustable voltage source for a group of signal lines. Thus, the voltage may be adjusted for each of the signal lines associated with the transmitter simultaneously in order to provide the voltage setting that gives the best margin for these signal lines. Similarly, a receiver may be configured to adjust voltage threshold levels for each of its signal lines individually, or may adjust all of its associated signal lines simultaneously. In such embodiments, the system may choose a set or sets of parameters from the table (stored in the same IC as the receiver) that allows signals to be sampled for all lines such that all signals are sampled within the eye pattern. In some cases, if the group of signal lines are of equal lengths, or if the delay time is such that a receiver may sample signals from each signal line associated with it within the eye pattern, a parameter set common to all lines may be chosen. In such cases, the voltage levels and the delay time are common for all signal lines associated with the respective transmitter and receiver. Parameters may also be adjusted at a chip level for some embodiments. Optimization may be performed based on worst case scenarios and to provide the best possible margin across a set of signals that share a common parameter.

As previously noted, the table of entries or other type of data structure may be stored in the IC in which the receiver is located, and may include transmission or reception parameters for each of the signal lines associated with the receiver. Other embodiments are possible and contemplated wherein the table of entries is stored in the IC in which the transmitter is located. In one embodiment, a table may include a plurality of rows and columns, wherein each row and each column represent a parameter. Each table may correspond to a single signal line. Storage mechanisms having other types of data structures are possible and contemplated. At each row-column intersection, a pass indicator may be present, indicating whether or not the receiver associated with the particular signal line (represented by the table) is able to correctly read the data value or sequence of patterns for the particular set of parameters (represented by the rows and columns of the table). In some embodiments, the table may be compressed down in size to include only those entries for which a passing result was obtained. The table may be further compressed to include only results for the beginning and end of the largest range of passing results.

In various embodiments, the data structure may be multi-dimensional. For example, a table may include columns corresponding to voltage levels, rows corresponding to delay times, and a third dimension that corresponds to a third parameter, such as termination. Thus, each element of the data structure may correspond to a voltage level and a delay time for a given signal line. It should be noted that additional parameters may also be included (as will be discussed below), and thus the data structure may include any number of dimensions. The data structure may take on any shape or organization (e.g. a cube, etc.) as necessary. As with the table, other embodiments of the data structure may also be compressed in size. The use of a multi-dimensional data structure may allow for optimization among a larger number of variables.

Parameters may be selected from the table using one of several different search algorithms available to the system. Such search algorithms may include, but are not limited to, linear or binary searches, searches based on first pass and first fail after pass (FP/FFAP), or largest margin of operation for one or more parameters.

Thus, in various embodiments, the system and method for automated calibration of I/O over a multi-variable eye window may allow signal lines for a receiver to be calibrated so that signal sampling occurs within the parameters defining an eye window. The calibration may be automatically performed at various times (such as system start-up), and may be re-performed if necessary. A table associated with the receiver may allow for the system to selectively calibrate each signal line individually, or calibrate groups of signal lines relative to one or more parameters.

BRIEF DESCRIPTION OF THE DRAWINGS

Other aspects of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 3:
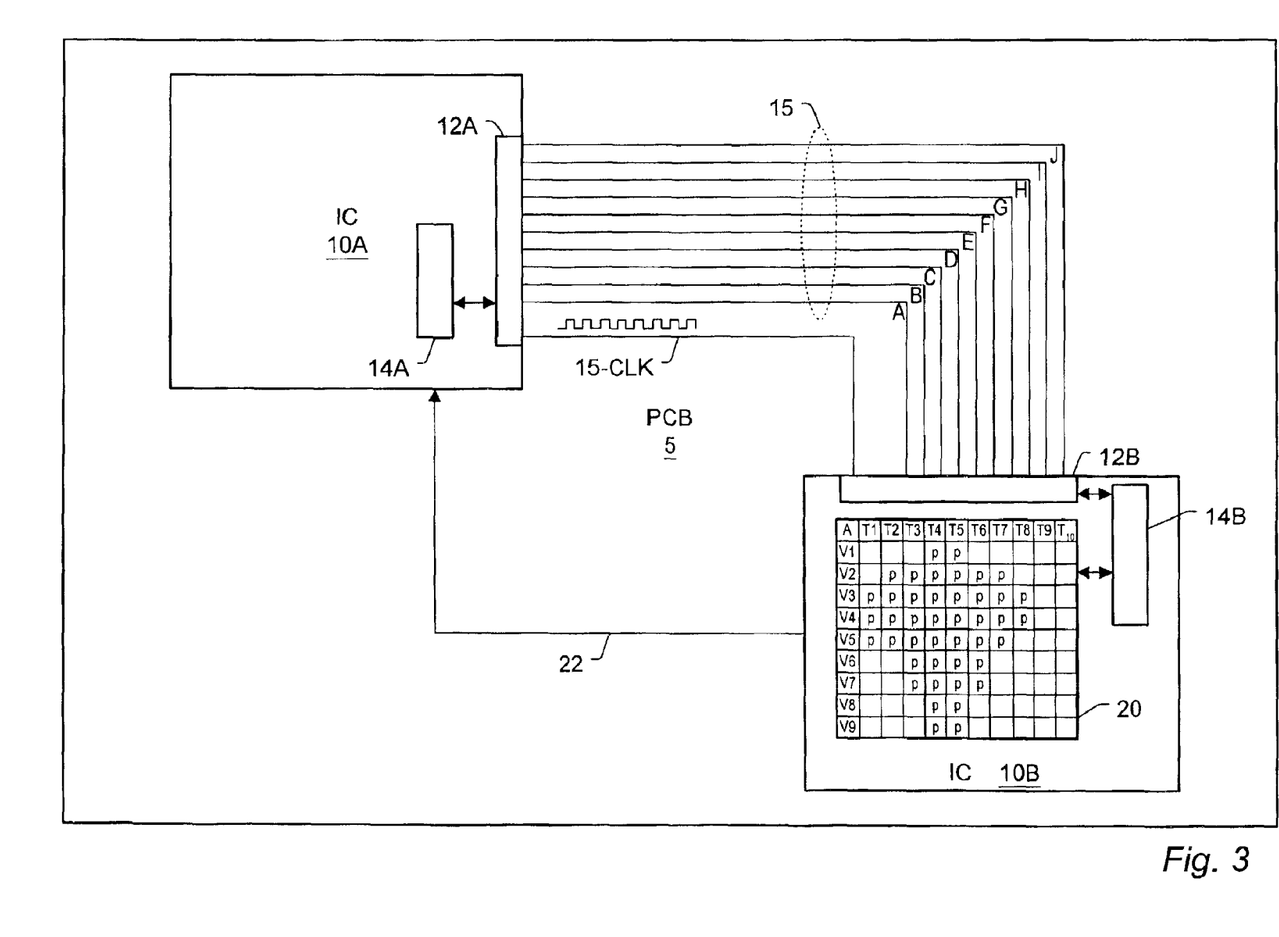
FIG. 3 is a drawing of one embodiment of a printed circuit board having two IC's, wherein the second IC includes a table.

Turning now to FIG. 3, a drawing of one embodiment of a printed circuit board having two IC's, wherein the second IC includes a table is shown. PCB 5 includes a first IC 10A and a second IC 10B, coupled by a plurality of signal lines 15. The embodiment shown includes 10 signal lines, 15A through 15J, which provide electrical coupling between the IC's through transmit port 12A and receiver port 12B. The embodiment shown is a source synchronous I/O system, and thus clock line 15-CLK is used to provide a clock signal for synchronizing data transmissions. Other embodiments which are not source synchronous are possible and contemplated. Transmitter 12A may generate a clock signal which may be received by receiver 12B, which may latch data received over the signal lines on one of the clock edges. Other communications links, such as communications link 22, may be present and allow second IC 10B to send information to first IC 10A. Communications link 22 may include one or more signal lines. First IC 10A also includes a control unit 14A, and second IC 10B includes control unit 14B. Control units 14A and 14B may provide control functions to transmitter 12A and receiver 12B, respectively, and may be utilized in determining and setting the parameters for communications between the two IC's. In another embodiment, a third device known as a service processor may be present. The service processor may be configured to read information from either first IC 10A or second IC 10B, and may also be configured to adjust parameters for either of these devices.

First IC 10A may be configured to transmit data to second IC 10B through transmitter 12A. Transmitter 12A may be a source synchronous transmitter, and may generate a clock signal, which may be conveyed to second IC 10B via clock line 15-CLK. Transmitter 12A in the embodiment shown is coupled to signal lines 15A through 15J, and may conduct data transmissions over these lines. Transmitter 12A may include one or more adjustable voltage sources. In one embodiment, transmitter 12A may include a separate adjustable voltage source for each signal line. In another embodiment, a single adjustable voltage source may be common to all signal lines associated with the transmitter 12A. The adjustable voltage sources may be configured to control the voltage levels at which data signals are transmitted from transmitter 12A. In the embodiments described herein, adjustable voltage sources may set voltage levels for logic one signals and logic zero signals. If necessary, the voltage levels for the data signals may be adjusted in order to ensure that the data signals may be sampled within the parameters defining an eye pattern. In one embodiment, control unit 14A may be utilized to set the voltage levels for the data signals based on information received from second IC 10B through communications link 22. Control unit 14A may also be utilized to set the voltage levels of various parameter sets when conducting transmissions in order to determine the optimal parameters or sets of parameters for conducting subsequent data transmissions. Furthermore, other parameters (e.g. delay shifting) may be set or adjusted at transmitter 12A.

Second IC 10B includes receiver 12B, which is configured to receive data transmissions from transmitter 12A of first IC 10A via signal lines 15A through 15J. In the embodiment shown, receiver 12B is a source synchronous receiver, and thus is configured to receive a clock signal transmitted over clock line 15-CLK. This clock signal may be used to synchronize the latching of received data transmissions. Receiver 12B may also be configured to adjust timing delays for receiving signals. For example, if receiver 12B is receiving data in parallel over signal lines 15A–15J, it may delay the latching of signals received on one or more of the shorter signal lines (15A, 15B, etc.) in order to ensure that the signals are all latched simultaneously. Receiver 12B may include at least one digital locked loop (DLL), which may be configured to adjust a phase shift for each signal line. Alternatively, receiver 12B may include an analog phase locked loop (PLL) instead of the DLL. In one embodiment, receiver 12B may include a separate DLL for each signal line, while other embodiments may include a single DLL configured to adjust the timing delay for a plurality of signal lines. In embodiments utilizing a single DLL for multiple signal lines, the DLL may be configured to adjust the phase shift (and thus the time delay) on an individual basis for each associated signal line. By adjusting the delay time, the DLL of receiver 12B may be able to ensure that the setup time and hold time is sufficient to enable data transmissions to be sampled within the parameters which define the eye pattern.

PCB 5 may be configured to perform automated calibration of signal lines 15. To perform the calibration, data transmissions may be conducted between first IC 10A and second IC 10B according to a set of parameters, including voltage levels and time delays. First IC 10A may transmit data through transmitter 12A according to parameters including voltage levels for logic 1's and 0's. Second IC 10B may be configured to receive data according to parameters including a timing delay and a reference voltage. During the calibration, first IC 10A may transmit a plurality of test vectors for each set of parameters, ensuring that receiver 12B is required to sample a plurality of logic 1's and logic 0's. Second IC 10B may latch data in through receiver 12B for each test vector transmitted, and may keep track of the results, including determining whether receiver 12B reads the correct data values on each signal line. Control unit 14B may be used to perform comparison functions for received data. In one embodiment, the test vectors and order of transmission may be stored or generated in second IC 10B. It should be noted that test vectors may be calculated by invoking a built-in self-test, or other method, which may eliminate the need for test vector storage. Control unit 14B may compare the latched data from each data transmission received from first IC 10A with the expected results defined by the stored or generated test vectors. Control unit 14B may also write pass/fail results, and other information into table 20, and may further be utilized to adjust the delay time or other receiver parameters for subsequent transmissions of test vectors and normal data transmissions.

In order for data to be latched into receiver 12B at the correct logic value, it must be latched in with the scope of parameters that define the eye pattern. Upon completion of the data transmissions according to the set of parameters, second IC 10B may record the results for each signal line in a table 20 (or other data structure), as noted above. At minimum, a pass/fail status for each signal line and the parameter set may be recorded in a table 20. In the embodiment shown, table 20 corresponds to signal line 15A, and includes test results for various voltage threshold and delay time settings. Test results may be stored for each of the remaining signal lines in additional ones of table 20, wherein each signal line has its own corresponding table. Various embodiments of table 20 will be discussed in further detail below.

After conducting transmissions according to a first set of parameters, the process may be repeated for a second set of parameters. The second set of parameters may include different voltage levels and/or different timing delays. Again, a plurality of test vectors may be transmitted through transmitter 12A, which are then received by receiver 12B. After completing the data transmissions, results may again be recorded in table 20 for each signal line and the corresponding set of parameters under which the transmissions occurred. The process may be repeated for as many different parameters or parameter sets as necessary.

Based on the results obtained from conducting transmissions according to a number of parameter sets, second IC 10B (or a service processor in some embodiments) may then select a parameter set or sets for which transmissions are to be conducted during normal operations. Selection of the parameter set or sets may be based in part on the configuration of both transmitter 12A and receiver 12B. For example, if transmitter 12A includes only one adjustable voltage source for the plurality of signal lines, then the same logic voltage levels may be selected for each line. Conversely, if transmitter 12A includes separate adjustable voltage sources for each signal line, logic voltage levels which provide the most margin of operation within the eye pattern may be selected for each individual signal line. Similarly, if the DLL configuration of receiver 12B permits, time delays may be individually selected for each signal line 15 in order to provide sufficient margin of operation for setup time and hold time. Second IC 10B may provide information to first IC 10A through communications link 22 for parameters controlled or set by first IC 10A (e.g. voltage levels). Alternatively, the parameters may be controlled or set by a service processor or external master chip that is separate from first IC 10A and second IC 10B. In general, embodiments are possible and contemplated wherein parameters are controlled and selected by a receiver, a transmitter, a service processor. Furthermore, embodiments are possible and contemplated wherein various combinations of these elements may control and select parameters.

In some cases, it may be necessary to re-calibrate signal lines 15. In such cases, PCB 5 may be configured to allow the calibration procedure to be rerun. In various embodiments, the calibration procedure may be rerun during a system startup or initialization routine, or may be run in conjunction with a BIST (built-in self-test). In general, the automated calibration routine may be run at any time necessary in order to ensure the integrity of data received over one or more signal lines. Furthermore, some embodiments may allow for the tracking of a change history for the margins of operation for each signal line. Tracking the changes in margin of operation over time for each signal line may allow for predictions of future performance or pending failure of a device associated with those signal lines for which tracking is performed.

It should be noted that PCB 5 may include integrated circuits other than those shown here, and thus both first IC 10A and second IC 10B may include transmitters and receivers. Each IC on PCB 5 may include a number of transmitters and receivers, enabling communications between the various IC's mounted on PCB 5. Tables such as table 20, or other storage mechanisms, may be implemented in any IC that is configured for automated calibration. Multiple tables (or other types of data structures which comprise the storage mechanism), each corresponding to a communications port, may be implemented for IC's having multiple communications ports. In some embodiments, a single table may be configured to store information for more than one communications port. Some IC's may include communications ports that are configured for both transmitting and receiving data. It should also be noted that, while the embodiments shown here are configured for source synchronous I/O, other embodiments that do not use source synchronous I/O are possible and contemplated. For example, the voltage threshold setting may be adjusted for two or more devices synchronized to a single clock. Changing the voltage threshold setting in such a system may affect the margin of operation for each of the two or more devices synchronized to the single clock.

Figure 4:
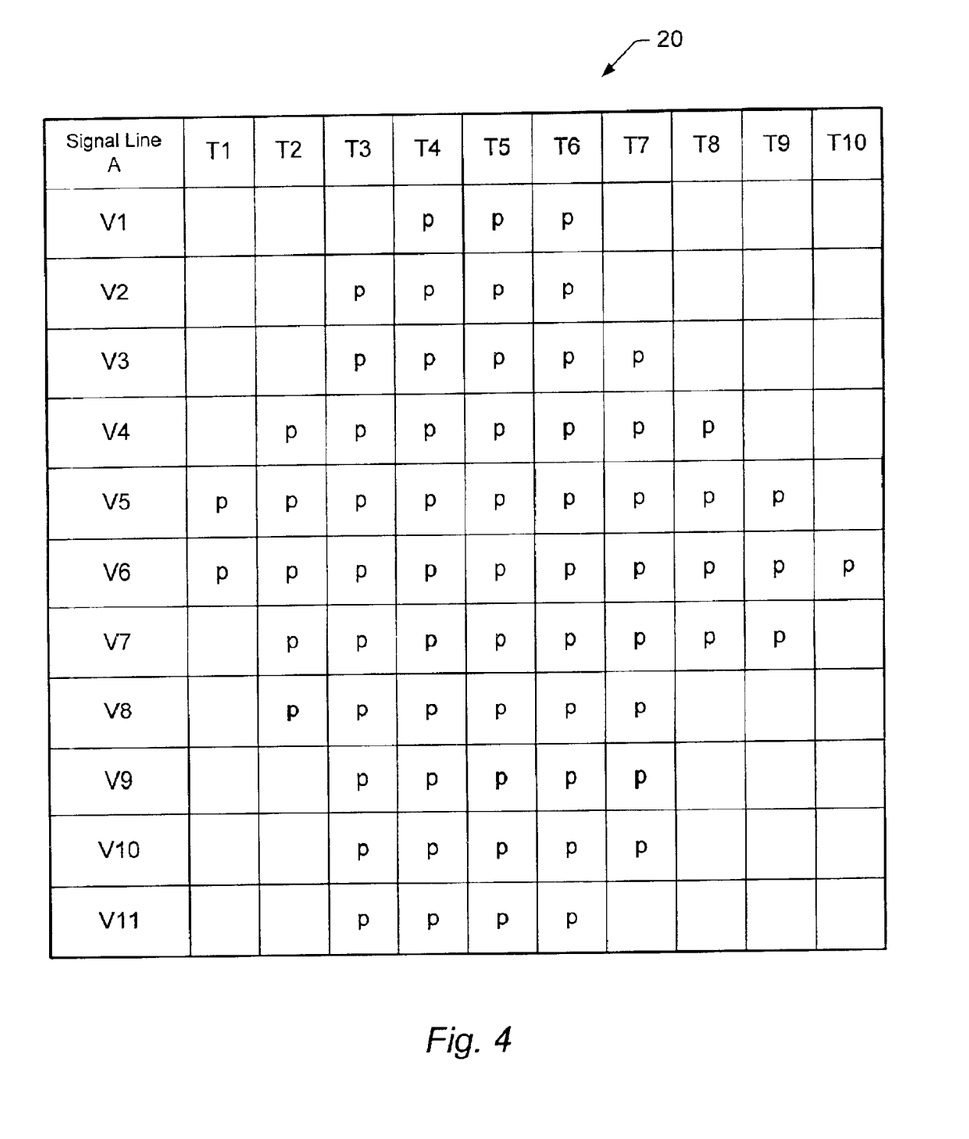
FIG. 4 is a drawing of one embodiment of a table configured to store test results for signal transmissions.

Moving now to FIG. 4, a drawing of one embodiment of a table configured to store test results for signal transmissions is shown. In the embodiment shown, table 20 stores test results for a single signal line (signal line A). Embodiments employing other types of data structures other than table 20 are possible and contemplated. In the embodiment shown, table 20 includes columns (T1–T10) corresponding to a first parameter (e.g. delay time). Table 20 also includes a plurality of rows (rows V1–V11 in this example), wherein each of the rows corresponds to a second parameter (e.g. voltage threshold). Table 20 may also be a multi-dimensional data structure for three or more parameters. There is no theoretical limit to the number of dimensions in table 20, and the size of table 20 may be adjusted depending upon the particular implementation.

Each parameter set for which rows, columns, or additional dimensions are implemented may include voltage levels for signal transmissions, time delays, and other parameters, as discussed above. Other parameters in addition to the voltage threshold levels and time delays may include termination (i.e. resistance of terminating resistors), signal drive strength, pre-emphasis (strength pre-emphasis or delay pre-emphasis) or other signal shaping approaches.

Table 20 includes a plurality of cells at each row-column intersection. Each cell includes information on the performance of signal transmissions over the corresponding signal line for the corresponding parameter set. In the embodiment shown, some cells include pass information, indicating the signal line passed the particular test for the parameter set represented by the row column intersection. In various embodiments, a signal line may be considered to pass a test for a particular set of parameters if it successfully reads the correct data value for each data value transmitted over that line during the transmission of test vectors (or, in some embodiments, if the bit error rate is acceptable). During the calibration procedure, signal lines may be tested by transmitting a number of test vectors from first IC 10A to second IC 10B. Each test vector may include a plurality of logic 1's and logic 0's to be transmitted over each signal line during each test. If a receiver 12B reads the correct logic value for each transmission over a given signal line (or reads data values within an acceptable bit error rate), the signal line may be considered to have passed the test for the parameter set, and thus a pass indication may be written into the corresponding cell.

In some embodiments, a fail indication may be written into the cell if the corresponding signal line does not pass a test for a particular parameter set. In other embodiments, such as that shown, the mere absence of a pass indication may be used to indicate that the corresponding signal line did not pass a test for the particular parameter set.

Other embodiments are also possible and contemplated wherein results are kept only for passing results. In such embodiments, the table or other storage mechanism may be compressed in size. For example, in one embodiment, a table may be compressed to include all passing results, but no failing results. In another embodiment, the table may be compressed to include only passing results within a certain margin of operation for one or more of the parameters (e.g. the table may be compressed to include the largest contiguous range of passes for one or more of the parameters). In embodiments wherein the table is compressed to store only a range of passes, it may be possible to compress the table further, storing only those parameters which represent the starting and ending points for the range of passes without storing any of the intermediate values. The starting and ending points may be represented by a first passing result within a range and the first failing result subsequent to the first passing result. The ending point may also be represented by the last passing result in the range.

After results have been recorded for each signal line and parameter set, selection of a particular parameter set may be performed for each signal line. The selection of parameter sets for signal lines may be based on factors such as the physical configuration of the signal lines, the transmitter, and the receiver. For example, on the transmitter side, if a plurality of signal lines is associated with a single adjustable voltage source, the voltage levels for the data signals to be transmitted will be set to the same level for each of the associated signal lines. Conversely, if each signal line is associated with a separate adjustable voltage source, the voltage levels for data signals transmitted over each of the signal lines may be adjusted separately, allowing a greater degree of control. In general, some embodiments may allow for the selection of parameters for each signal line individually, while some embodiments may allow for the selection of parameters for groups of signal lines.

On the receiver side, the time delays may be adjusted on an individual basis for each signal line in some embodiments, or may be adjusted for all signal lines on a group basis in others. In one embodiment, a separate DLL (or PLL) may be dedicated to each individual signal line, and thus the time delay for that signal line may be adjusted for its associated signal line without affecting the other signal lines. In other embodiments, a single DLL may be associated with a group of signal lines, and thus adjusts the timing delay for each signal line simultaneously. In some embodiments, it may also be possible to adjust the timing delays on the transmitter side.

Various selection algorithms may be used to determine the parameters used for transmissions across each signal line. In one embodiment, selection algorithms may be executed by control unit 14B. One selection algorithm may include a scanning of rows or columns in a table associated with a particular signal line. The row or column may be scanned to ascertain the first passing set of parameters for the associated signal line, and the first failing set that occurs after encountering the first passing set. A point at or near the midway point between the first pass and first fail after pass may be selected as the parameter set for subsequent transmissions over that particular signal line. However, the algorithm must also ensure that any other transmission parameters meet at least minimum margin requirements.

Some selection algorithms may prioritize one parameter over another in making a selection for subsequent transmission. For example, voltage may be prioritized as a parameter over delay time (or clock-to-data skew) in order to ensure an optimal amount of operating margin for voltage, while ensuring that at least a minimum margin is met for delay time. In another example, delay time may be prioritized over voltage in order to ensure an optimal margin for delay time, while ensuring that at least a minimum margin is met for voltage.

Additional information may be considered when selecting parameter sets for signal lines. Some algorithms may consider information concerning margin of operation in choosing a parameter set. For example, if choosing between parameter set 5 or parameter set 6 for signal line G, the selection algorithm may select the parameter set having the larger margin of operation for a given parameter. In another example where a common parameter set is chosen for the group of signal lines of FIG. 4, an average margin of operation may be computed for one or more parameters for the plurality of signal lines. The parameter set chosen may be that which has the greatest average margin of operation.

In some cases, a given signal line may not pass for any parameter set. This may be an indication of a broken signal line or a faulty transmitter or receiver. This information may be provided to a user for troubleshooting purposes.

Table 20 (or other data structures) may be stored in memory circuitry within an IC. Types of memory circuitry in which table 20 may be stored include DRAM, SRAM, registers, and flash memory.

Figure 5:
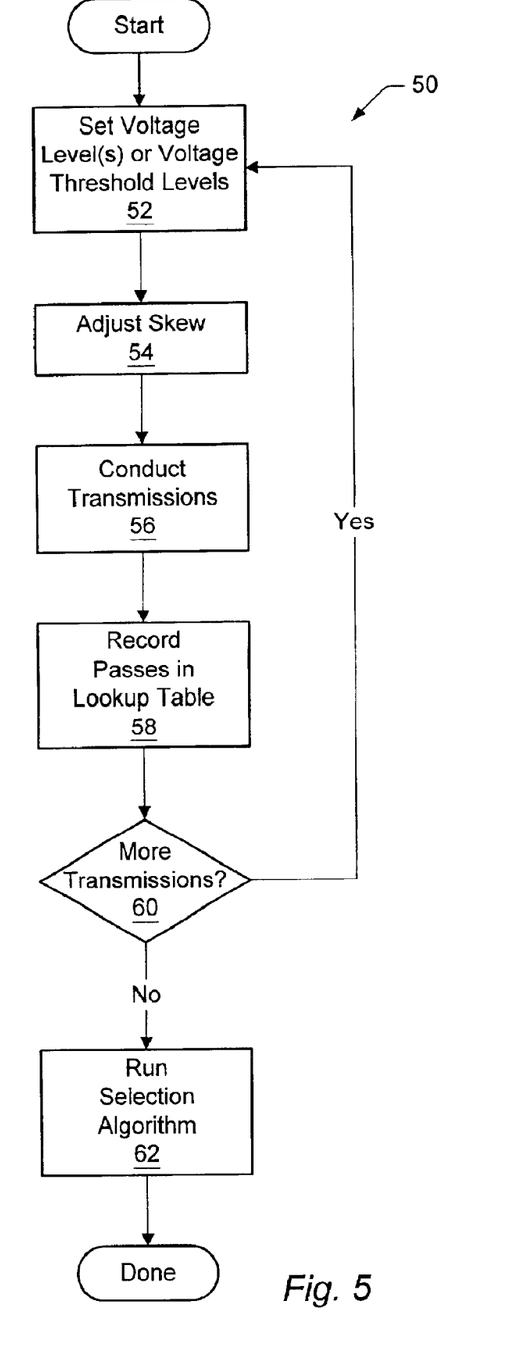
FIG. 5 is a flowchart for one embodiment of a method for the automated calibration of I/O lines.

Turning now to FIG. 5, a flowchart for one embodiment of a method for the automated calibration of I/O lines is shown. Method 50 begins with the setting of voltage levels or voltage threshold levels (Operation 52). In some embodiments, voltage threshold levels may be set by a receiver, such as receiver 12B of FIG. 3. The voltage threshold levels may include the minimum voltage level for which the receiver will recognize a data bit to be a logic high (or logic 1) and the maximum voltage level for which the receiver will recognize a logic low (or logic 0). In some embodiments, the receiver may be able to adjust the voltage threshold levels individually for each line, while in other embodiments, the receiver may adjust the voltage threshold levels for a plurality of signal lines. Some embodiments may allow for the setting of voltage transmission levels at the transmitter (including settings for transmissions with pre-emphasis) by an adjustable voltage source.

In Operation 54, skew between the clock signals and data signals is adjusted by a receiver, such as receiver 12B of FIG. 3, which is coupled to the transmitter by a plurality of signal lines. The receiver (or, in some embodiments, the transmitter) may be able to adjust the skew between the clock and data signals individually for each of its associated signal lines, or may adjust skew for a plurality of signal lines. The adjustment of the skew may determine a point in time within a clock cycle when signals are sampled by the receiver. The skew may also determine the margins of operation for setup time and hold time for the sampled signals. In one embodiment, the skew may be adjusted by one or more DLL circuits (or PLL circuits) associated with the receiver, wherein the skew is adjusted by adjusting timing delays within the DLL. Timing delays may be adjusted by time-shifting the clock signals, the data signals, or both.

With the voltage levels and skew set, the transmitter may begin transmitting data to the receiver (Operation 56). The transmitted data may be test vectors. A plurality of test vectors may be transmitted by the transmitter, which may allow the receiver to sample a number of logic 1's and logic 0's. With each test vector transmitted by the transmitter and received by the receiver, a control unit or other circuitry in the IC of the receiver may keep track of whether or not correct data values are latched in to the receiver.

After completing the transmission of test vectors for the particular voltage levels and delay times, pass/fail information may be recorded in a table or other storage mechanism (Operation 58). The pass/fail information may then be used to select parameters for subsequent data transmissions. The selection may be made for individual circuit lines, or for a plurality of circuit lines.

In Operation 60, a determination is made as to whether more transmissions of test vectors are to be made. If it is desired to test and or calibrate the circuitry according to additional transmission and reception parameters, additional transmissions may be made, and thus the method may return to Operation 52.

If no additional transmissions are to be made, the method may then perform a selection algorithm in order to select the various parameters for which data transmissions are to be conducted under normal operations (Operation 62). Various selection algorithms may be used to select parameters for transmissions, and may depend upon the configuration of the devices involved. Some embodiments may allow for the adjusting of parameters for each signal line individually. For example, the table of FIG. 4 may include test results for a signal line which may be individually tuned. If the parameters to be adjusted are voltage and delay time, a selection algorithm may select either voltage V5 or V6, and either delay time T4 or T5 to provide the maximum amount of operating margin for both of these parameters. The selection of these parameters may allow for signals to be sampled at or near the center of the eye pattern, and provide a large margin of operation.

In other embodiments, parameters may be adjusted for a group of signal lines. In such embodiments, parameters may be prioritized to allow for larger margins of operation for the prioritized parameter, while meeting at least minimum requirements for the remaining parameters.

Parameters may be selected from the tables or other data structures using one of several different search algorithms available to the system. Such search algorithms may include, but are not limited to, linear or binary searches, searches based on first pass and first fail after pass (FP/FFAP), or largest margin of operation for one or more parameters.

It should be noted that while the various embodiments of the system and the method described above have included a first IC (having a transmitter) and a second IC (having a receiver), embodiments are contemplated using only a single IC. A single IC embodiment may include both a transmitter and a receiver, and may further include the table. The method may be performed beginning with data transmissions from the transmitter of the IC to the receiver of the IC. It should also be noted that many IC's may include multiple transmitters and/or receivers. Furthermore, the method may also be performed by conducting data transmissions between a chip and automated test equipment.

While the present invention has been described with reference to particular embodiments, it will be understood that the embodiments are illustrative and that the invention scope is not so limited. Variations, modifications, additions, and improvements to the embodiments described are possible. These variations, modifications, additions, and improvements may fall within the scope of the inventions as detailed within the following claims.

What is claimed is:

1. A method comprising:
   performing a plurality of communications between a transmitter and a receiver according to different parameters, wherein the transmitter and receiver are coupled together by a plurality of signal lines;
   determining whether a correct data value is received by the receiver for each of the plurality of communications;
   storing data transmission results in a storage mechanism, wherein the data transmission results are indicative of whether correct data values were received for the plurality of communications;
   selecting designated parameters for each of the plurality of signal lines for subsequent communications between the transmitter and the receiver based upon the data transmission results, wherein said selecting designated parameters includes the receiver adjusting skew between data signals and a clock signal conveyed between the transmitter and the receiver for each of a plurality of signal lines coupling the transmitter to the receiver.

2. The method as recited in claim 1, wherein the different parameters determine a point in an eye pattern at which a signal is sampled.

3. The method as recited in claim 1, wherein the storage mechanism is a table, wherein the table is configured to store transmission results for each of the plurality of signal lines according to each of the parameters for which transmissions are conducted, and wherein the transmitter is embodiment in a first integrated circuit (IC) and the receiver is embodied in a second IC.

4. The method as recited in claim 3, wherein the table is stored in a set of registers in the second IC.

5. The method as recited in claim 3, wherein the table is stored in a dynamic random access memory (DRAM) in the second IC.

6. The method as recited in claim 3, wherein the table is stored in a static random access memory (SRAM) in the second IC.

7. The method as recited in claim 1, wherein the transmitter is a source synchronous transmitter and the receiver is a source synchronous receiver.

8. The method as recited in claim 7 wherein the source synchronous transmitter includes a adjustable voltage source, wherein the adjustable voltage source is configured to generate a voltage level at which signals are to be transmitted over one or more of the plurality of signal lines.

9. The method as recited in claim 7, wherein the source synchronous receiver is configured to adjust the skew between data signals and a clock signal, wherein adjusting the skew includes adjusting a timing delay for each of the plurality of signal lines, wherein adjusting the timing delay determines a point in time within a cycle of the clock signal in which a data signals received over one or more of the plurality of signal lines is sampled.

10. The method as recited in claim 1, wherein a service processor is configured to monitor data transmissions between the transmitter and the receiver, and wherein the service processor further comprises the storage mechanism.

11. The method as recited in claim 1, wherein the circuit carrier is a printed circuit board (PCB).

12. The method as recited in claim 1, wherein the method is performed in conjunction with a built-in self-test (BIST).

13. A system comprising:
    A transmitter located on a circuit carrier;
    a receiver coupled to the transmitter by a plurality of signal lines;
    wherein the transmitter is configured to conduct a plurality of data transmissions over the plurality of signal lines;
    wherein the receiver is configured to:
      receive the data transmissions and to sample data into the receiver according to different parameters;
      determine whether a correct data value is received by the receiver for each data transmission; and
      adjust skew between data signals and a clock signal conveyed between the transmitter and the receiver for each of the plurality of signal lines;
    and wherein the system is further configured to:
    store data transmission results in a storage mechanism, wherein the data transmission results are indicative of whether correct data values were received for the data transmissions; and
    select parameters for each of the plurality of signal lines for subsequent data transmissions based on the data transmission results and skew adjustments for each of the plurality of signal lines.

14. The system as recited in claim 13, wherein the different parameters determine a point in an eye pattern at which a signal is sampled.

15. The system as recited in claim 13, wherein a data value is considered correct if the data value is received in an area defined by the parameters of an eye pattern.

16. The system as recited in claim 13, wherein the storage mechanism is a table, wherein the table is configured to store transmission results for each of the plurality of signal lines according to each of the parameters for which transmissions are conducted.

17. The system as recited in claim 16, wherein the table is stored in a set of registers coupled to the receiver.

18. The system as recited in claim 16, wherein the table is stored in a dynamic random access memory (DRAM) coupled to the receiver.

19. The system as recited in claim 16, wherein the table is stored in a static random access memory (SRAM) coupled to the receiver.

20. The system as recited in claim 16, wherein the table is compressed to store only passing results.

21. The system as recited in claim 16, wherein the table is compressed to store only starting and ending points for a range of passes.

22. The system as recited in claim 13, wherein the circuit carrier is a printed circuit board (PCB).

23. The system as recited in claim 13, wherein conducting the plurality of data transmissions, receiving the plurality of data transmissions, and storing the data transmission results are done in conjunction with a built-in self-test (BIST).

24. The system as recited in claim 13, wherein adjusting the skew includes adjusting a timing delay for each of the plurality of signal lines, wherein adjusting the timing delay determines a point in time within a cycle of the clock signal in which data signals received over one or more of the plurality of signal lines is sampled.

* * * * *